No. 654,835. Patented July 31, 1900.
L. MANDL.
CYCLE SADDLE.
(Application filed Mar. 21, 1899.)
(No Model.) 2 Sheets—Sheet 1.
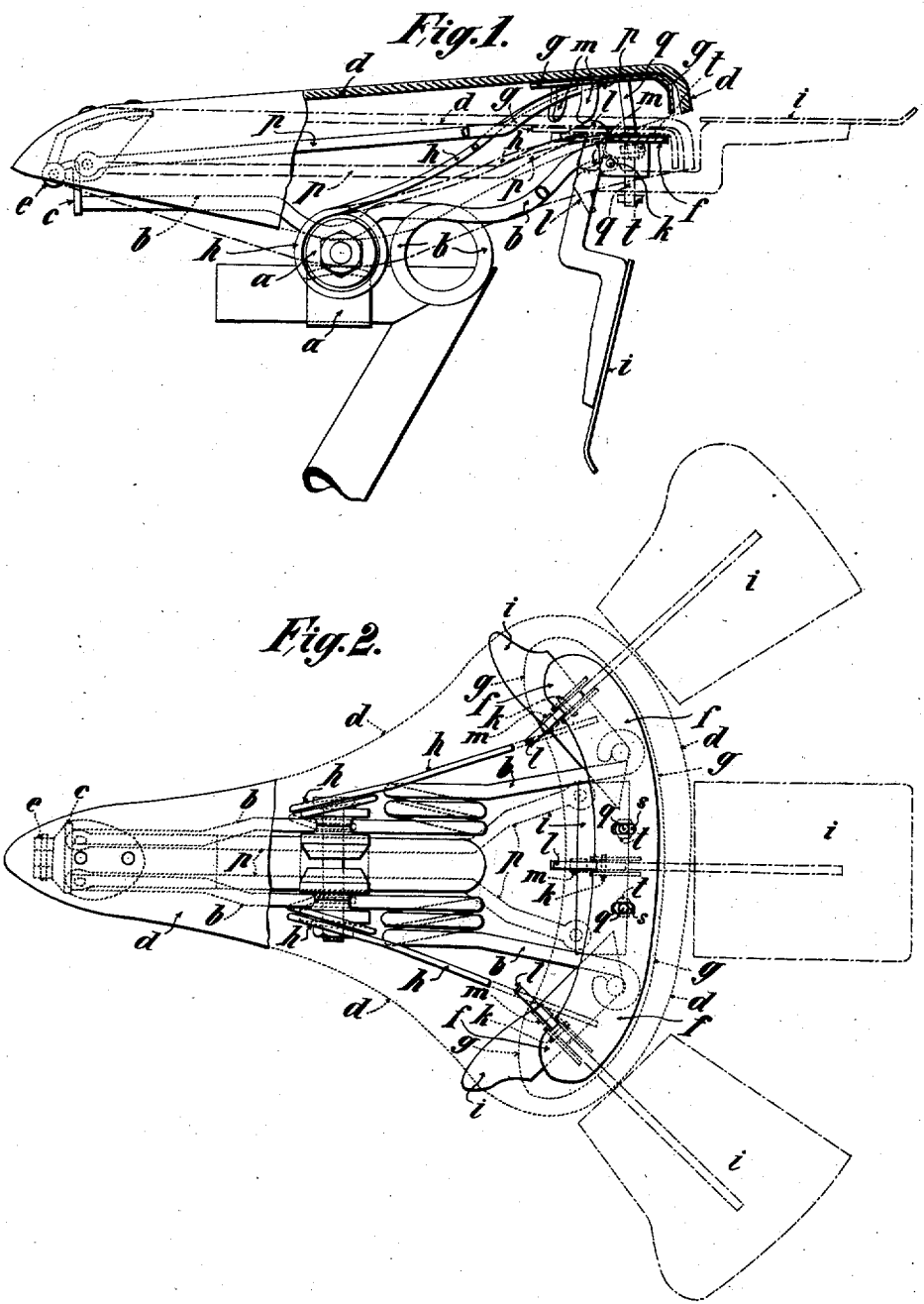
Witnesses: 
Inventor: 

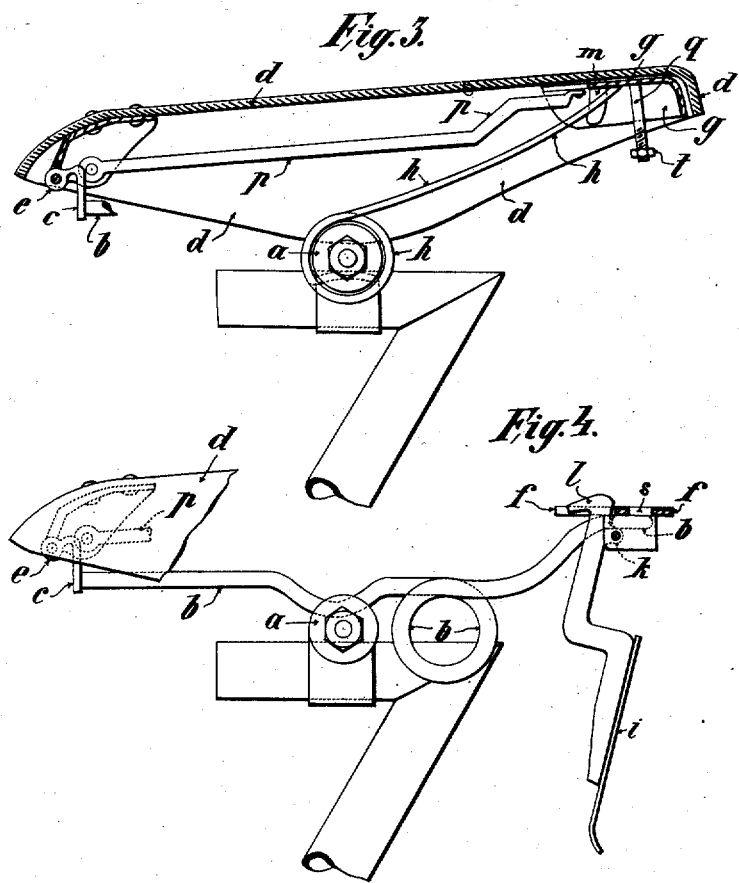

UNITED STATES PATENT OFFICE.

LUDWIG MANDL, OF VIENNA, AUSTRIA-HUNGARY.

CYCLE-SADDLE.

SPECIFICATION forming part of Letters Patent No. 654,835, dated July 31, 1900.

Application filed March 21, 1899. Serial No. 709,950. (No model.)

*To all whom it may concern:*

Be it known that I, LUDWIG MANDL, a subject of the Emperor of Austria-Hungary, residing at Vienna, in the Province of Lower Austria, in the Empire of Austria-Hungary, have invented certain new and useful Improvements in Cycle-Saddles, of which the following is a specification.

This invention relates to improvements in cycle-saddles, and has for its object to construct a saddle which upon being loaded with the weight of the rider will automatically enlarge its seating-surface.

The types of cycle-saddles now in general use present too small a seating-surface. They cannot very well be enlarged without making them clumsy and ungainly in appearance in comparison to the other parts of the machine and would, furthermore, by their increased dimensions obstruct the rider in mounting. The aforesaid disadvantages are especially noticeable in saddles of cycles ridden by women and broadly-built and corpulent men, who on account of having a wider pelvis do not find on the ordinary saddle a seating-surface corresponding to their anatomical dimensions. The new or improved saddle forming the subject of the present invention has when not loaded with the weight of the rider the size and general conformation of the ordinary saddle, but is adapted to automatically enlarge its seating-surface at the moment of being loaded and to maintain the enlarged surface as long as the rider retains his seat. When the rider dismounts, the saddle automatically resumes its normal size and shape. This effect is produced by means of an arrangement of lever-lappets which are pivoted or hinged below the saddle in such manner that one of their arms will be turned upward by the weight of the rider pressing down the other arm. The first-mentioned outer arm of the lever-lappet is thereby made to rise to the level of the seating-surface of the saddle, enlarging the same to the extent of its own surface area. When the rider dismounts, the dead-weight of the outer arms of the lever-lappets will force the latter back into their normal position—*i. e.*, hanging down under the saddle.

The present invention does not interfere with the general construction of saddles now in use, and any existing saddle can easily be altered and provided with the characteristic improvements of the invention, the supporting capacity and resiliency of the saddle being in no way impaired thereby.

A method of carrying out the invention in practice is hereinafter described, and illustrated in the accompanying drawings. The said drawings, throughout the figures of which like letters indicate like or corresponding parts, show a cycle-saddle constructed in accordance with this invention.

Figure 1 shows the saddle in longitudinal section; Fig. 2, in top view, the seat-leather being partly removed. Fig. 3 shows the leather seat and the spring maintaining the same in its raised position when not loaded; Fig. 4, the crescent-shaped lower back rail supported by the bearing-spring and the lever-lappets. Fig. 5 is a plan view of the lower back rail.

It will be seen in the drawings that the leather seat $d$ is attached to bearing-spring $b$, which is secured to the clamp $a$ by means of a hock or hinge $e$ at the peak end $c$ of spring $b$. The rear ends of spring $b$ are fastened to the crescent-shaped back rail $f$. A part corresponding to the rail $f$ has hitherto been rigidly connected with the leather of the seat $d$, so that the latter and bearing-spring $b$ were made to form a whole. According to this present invention the leather seat is provided with a similar crescent-shaped rail $g$ at the part formerly occupied by rail $f$ and is held expanded or stretched by a separate spring $p$. The ends of a second suitably-curved spring $h$, also held by clamp $a$, are secured to rail $g$, the said spring $h$ having the tendency to raise the broad rear portion of the seat $d$, so that the two rails $f$ and $g$ are normally held at a certain distance—say one and one-half to two centimeters—from each other, while upon the saddle being loaded with the weight of the rider the spring $h$ is overcome and the seat is turned down around the pivot or hinge $e$ at the peak end $c$ of spring $b$ until rail $g$ is made to lie on rail $f$, whereby the saddle assumes the exact appearance and resilient condition of an ordinary saddle, as the whole of the load is made to rest upon bearing-spring $b$. This downward movement of rail $g$ is utilized for turning movable lever-lappets $i$, pivoted or hinged preferably below the rail $f$ in such manner that their surfaces are raised into the plane of the seating-surface of the saddle, thereby enlarging the extent of the latter. The said lever-lappets $i$, made in suitable dimensions, are turnable on pivots or in hinges $k$, mounted on rail $f$, and have a lever-arm $l$, which engages with a boss or projection $m$, provided on rail $g$, as soon as the seat $d$ is pressed down by the load. The outer arm of lever-lappet $i$ is thereby raised into the plane of the seating-surface, enlarging the latter in the manner indicated in dotted lines in Figs. 1 and 2. Upon the load being removed from the saddle the spring $h$ again raises the seat, and the lappet $i$, owing to the greater weight of the outer arm, resumes its former position and hangs down below the saddle. The said lappets $i$ are provided only at the broad rear end of the saddle, where the body of the rider finds its principal support, while the narrow front portion or peak of the saddle retains its original shape in order not to interfere with the free movement of the legs of the rider.

It is obvious that the inherent resiliency of the saddle is not impaired, as upon the rider having taken his seat the spring $b$ alone is made to support the full load, the same as in the ordinary type of saddles.

For the purpose of insuring regularity in the relative movement of the displaceable portion of the saddle and preventing lateral displacement guides may be provided, represented in the drawings by pins $q\ q$, attached to rail $g$, which pass through slots $s$ in the lower rail $f$ and so form a reliable guide and also limit, by means of nuts $t$, the turning movement or throw of the seat and its supports upon hinge or pivot $e$.

In order to increase the weight of the saddle as little as possible, the aforesaid lappets $i$ are made very light and of tough material; but the selection of suitable size, weight, and material does not affect the nature of the invention. One or both sides of the outer arms of lappets $i$ may have a covering of fabric, leather, or other convenient material.

Having now particularly described and ascertained the nature of this invention and in what manner the same is to be performed, I declare that what I claim is—

1. A cycle-saddle having a pivotally-mounted body portion, a rail secured to the under side thereof at its rear end, a second rail arranged below the first, a spring having a connection with the forward end of the body of the saddle and having its rear end connected with the second rail, lever-lappets pivotally connected with the second rail and having each an arm, projections on the first rail adapted to strike the arms of the lappets when the rear end of the body of the saddle is depressed.

2. A cycle-saddle having a pivotally-mounted body portion, a rail secured to the under side thereof at the rear end, a second rail arranged below the first, lever-lappets pivotally arranged below the body, means whereby when said body is tilted downwardly at the rear the lappets will be swung upwardly into position in a plane with the seating-surface of the body, pins depending from the first rail passing through slots in the second rail, and nuts screwing upon the lower ends of the pins.

In testimony that I claim the foregoing as my invention I have signed my name in presence of two subscribing witnesses.

LUDWIG MANDL.

Witnesses:
 SIMON STADLER,
 ALVESTO S. HOGUE.